A. & N. KANE.
Grain and Grass Harvester.
No. 27,989.  Patented April 24, 1860.
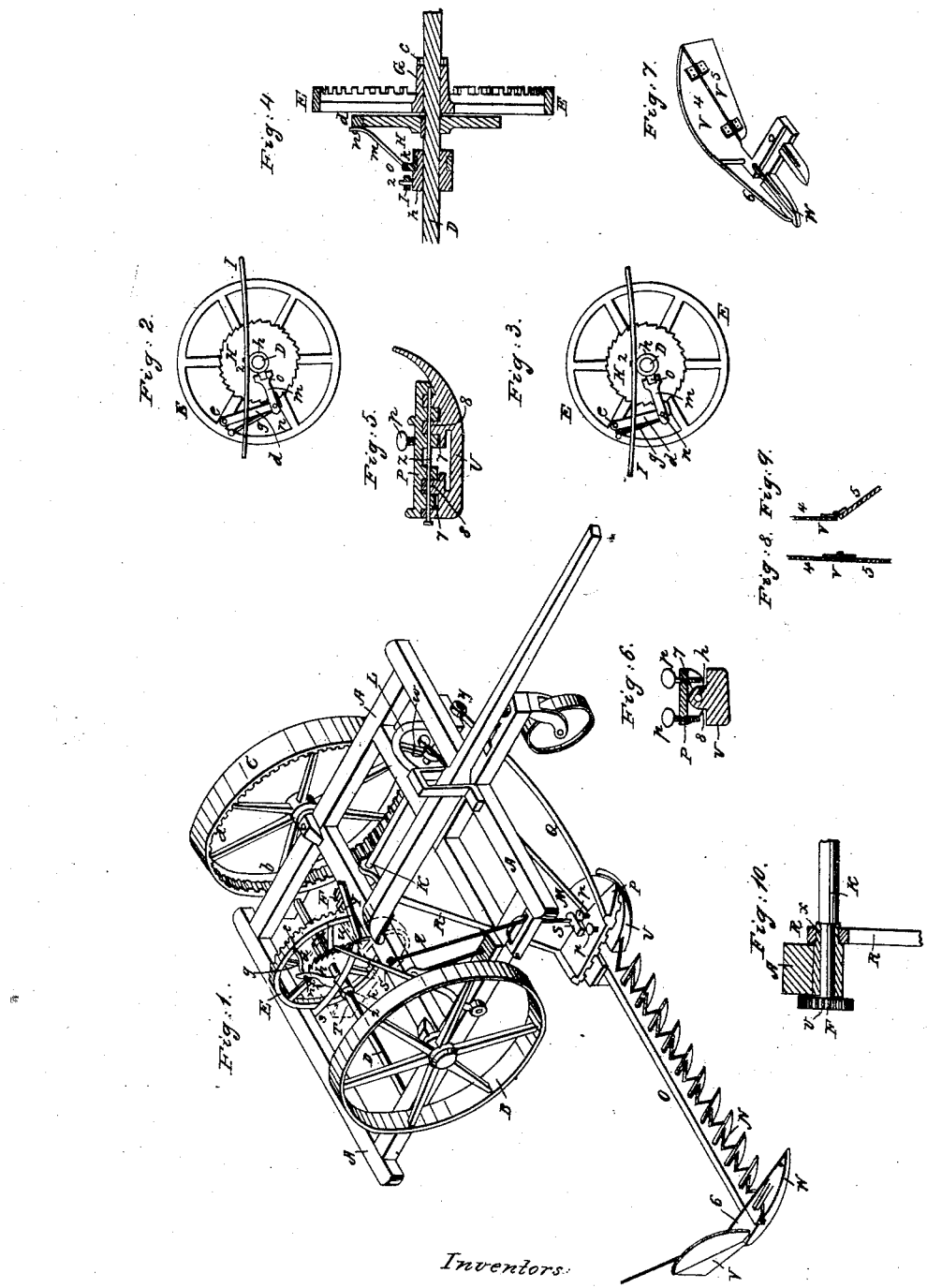
Inventors
A. Kane.
N. Kane.
by their attorney
A. B. Stoughton.

UNITED STATES PATENT OFFICE.

A. KANE AND N. KANE, OF NEWPORT, NEW YORK.

IMPROVEMENT IN HARVESTERS.

Specification forming part of Letters Patent No. 27,989, dated April 24, 1860.

*To all whom it may concern:*

Be it known that we, A. KANE and N. KANE, of Newport, in the county of Herkimer and State of New York, have invented certain new and useful Improvements in Grain and Grass Harvesters; and we do hereby declare that the following is a full, clear, and exact description of the construction and operation of the same, reference being had to the accompanying drawings, in which—

Figure 1 represents a perspective view of said grain and grass harvester. Figs. 2 and 3 represent side views of the devices for coupling and uncoupling the cutting apparatus to and from the driving-wheels. Fig. 4 represents a vertical central section through said coupling apparatus. Fig. 5 represents a longitudinal vertical section through the shoe by which the cutting apparatus is connected to the frame of the machine. Fig. 6 represents a cross-section through said shoe. Fig. 7 represents a perspective view of the track-clearer. Figs. 8 and 9 represent vertical sections through said track-clearer. Fig. 10 represents a detached view, hereinafter to be referred to.

The nature of our invention relates, first, to the manner of connecting a spring-pawl with a lever which can be operated by the conductor from his seat, so that the pawl may be thrown out at any time, whether the machine be in motion or not, to stop the cutters, said pawl, though so connected, still slipping over its ratchet when the machine is backed, as in the common ratchets.

It also relates to the manner of connecting the cutter-bar to the frame of the machine, by means of which said cutter-bar may adapt itself to the irregularities of the ground when the machine is used as a mower, or be connected rigidly to the shoe when the machine is used as a reaper; and it further relates to the construction of the track-clearer, by means of which the lower part of said track-clearer is made yielding when the machine is backed, but is held rigidly and in a vertical position when the machine is moved forward.

To enable others skilled in the art to make and use our invention, we will proceed to describe its construction and operation.

A represents the frame of the machine, which is supported by the wheel B and driving-wheel C, the latter being provided with cogs $a$, which mesh into the pinion $b$, which is secured to the shaft D, the latter having bearings in the frame A.

E represents a bevel, which can turn loosely on the shaft D, and the hub G of which bears against the collar $c$ of said shaft, as represented in Fig. 4.

H represents a ratchet-wheel, which is secured permanently to the shaft D, and which turns with the same.

$d$ represents a pawl, which is pivoted at $e$ to the side of the wheel E, and the end of which bears on the teeth of the ratchet-wheel H, it being pressed down on said teeth by the spring $g$, which is also secured to the side of the wheel E, as represented at Fig. 2.

$h$ represents a sleeve, which can be moved longitudinally on the shaft D by means of a lever, I, which is pivoted to said sleeve by a pin, 2, and which has its fulcrum near the point 3 in the frame A of the machine.

$k$ represents a collar, which is embedded in a circumferential groove in the sleeve $h$, and which can turn on said sleeve.

$m$ represents an arm, which is hinged at $o$ to the collar $k$, and the end of which is pivoted at $n$ to the end of the pawl $d$. This apparatus constitutes the coupling and uncoupling apparatus of the machine.

F represents a pinion, which is driven by the wheel E, and which is secured to the shaft K. The shaft K has its bearings in the journal-boxes $v$ and $w$, which are secured to the frame A, and the journal-box $v$ has on its front side a hollow wrist, $x$, over which the end of the brace R is hung, (better seen in Fig. 10,) for a purpose that will be hereinafter described.

The balance-wheel L is secured to the shaft K, and the pitman M, which operates the sickle-bar and the cutters N of the machine, is hinged to one of the arms of said balance-wheel, which, having sufficient weight on its circumference and being driven at a high speed, will by its momentum give to the knives N several vibrations after the machine is stopped, and will thus clear the cutters and guard-fingers of any grass lodging between them, and will dispense with the necessity of clearing them by hand, which is dangerous to the operatives.

The shoe-plate P is hinged to the machine by means of the braces Q and R, in such a manner that it can swing on a fulcrum which is in the geometrical axis of the shaft K, the brace R being hung to the wrist $x$ of the box $v$, and the brace Q to a bolt, $y$, which is in the line of elongation of the shaft K. The manner of hanging the brace R over the wrist $x$ affords this advantage, that said rod may be made considerably shorter than if it were hung to the rear beam of the machine in a similar manner as the brace Q is hung to the front beam, it not being practicable to hang said brace directly to the shaft K. The shoe-plate P can be raised and lowered by operating the lever S, to which the chain or cord $q$ is secured, which passes over the pulley $r$, and which is fastened to the projection S of the shoe-plate P.

U represents a shoe, to which the finger-bar O is secured. It is hinged longitudinally to the shoe-plate P by means of a bolt, $z$, which passes through the lugs 7 and 8 of the shoe-plate P and shoe U. This arrangement permits the finger-bar and the entire cutting apparatus to swing freely on the bolt $z$, and thus to adapt itself to the irregularities of the ground, as is very desirable in mowing-machines; but when the machine is used as a reaper the connection between the finger-bar O and the shoe-plate P and shoe U can easily be made rigid by running tight down the set-screws $p\ p$, one of which is on each side of the hinge, and turning them until their ends bear against the upper side of the shoe U.

V represents the track-clearer. It is secured to the divider W, and the connection between the two is strengthened by means of a rod, 6, which passes from the track-clearer to the front end of the outside divider, W. The track-clearer is composed of two sections, 4 and 5, which are hinged together in such a manner that when the machine is moved forward they operate jointly, like a common track-clearer, presenting one straight board, as represented in Fig. 8; but as soon as the machine is backed the section 5 can turn on its hinge and yield, thereby preventing it from being injured by striking the ground.

The operation is as follows: As the machine is moved forward the driving-wheel C turns the pinion $b$, the shaft D, and the ratchet-wheel H, which is secured to said shaft, and as the pawl $d$ is pressed against the teeth of said wheel, the bevel-wheel E is turned, the pawl $b$ being secured to it. The bevel-wheel E drives the pinion F, shaft K, balance-wheel L, pitman M, and the cutting apparatus. If the driver on the seat T (which is represented in red lines) wishes to uncouple the cutting apparatus, he raises the lever I out of its notch in the guard $u$ and pushes the same toward the ratchet-wheel H. Thus the sleeve $h$ is also moved toward said wheel, and the arm $m$ raises the pawl $d$ out of the teeth of the wheel H, and the wheel E is disconnected from the same, as represented in Fig. 3. When the machine is backed the teeth of the wheel H do not act on the pawl $d$ as it slips over them, and thus the wheel E does not run with the shaft D, and the cutters consequently are not operated; but as soon as the machine is moved forward, the teeth of ratchet-wheel H bear against the pawl $d$ and turn the wheel E and operate the cutting apparatus. Thus this apparatus is made self-acting for the coupling or uncoupling of the cutting apparatus when the machine is moved forward or when it is backed, but may be entirely thrown out by the driver or conductor from his seat, whether the machine be in motion or not, and regardless of where the pawl may be—that is, on what part of the wheel it may be.

Having thus fully described the nature of our invention, what we claim therein as new, and desire to secure by Letters Patent, is—

1. So combining a lever that extends from the conductor's seat with a ratchet and pawl, by means of a hinged arm, $m$, or its equivalent, as that the driver or conductor from his seat may throw said pawl out of action with said ratchet entirely, and when the machine is in motion or otherwise, and yet admit of said pawl slipping over the ratchet when in gear with it and when the machine is backed, substantially as described.

2. In combination with the shoe-plate P and shoe U, the latter of which is secured to the finger-bar, and the former to the braces Q and R, the set-screws $p\ p$, one on each side of the hinge-joint, for the purpose of making a rigid connection between the finger-bar and the shoe when the machine is to be converted into a reaper, substantially as described.

3. Making the track-clearer of a harvesting-machine in two sections, when the same are hinged togther in such a manner that they act like a stiff track-cleaer when the machine is moved forward, but that the lower section may swing on the hinges and yield when the machine is backed, substantially in the manner herein described.

A. KANE.
N. KANE.

Witnesses:
CLINTON A. MOORE,
JOSEPH JENKINS.